United States Patent
Wiegand et al.

(10) Patent No.: US 12,104,969 B2
(45) Date of Patent: Oct. 1, 2024

(54) SENSOR FOR DETECTING PRESSURE AND/OR FILLING LEVEL AND/OR FLOW RATE AND/OR DENSITY AND/OR MASS AND/OR TEMPERATURE

(71) Applicant: WIKA Alexander Wiegand SE & Co. KG, Klingenberg/Main (DE)

(72) Inventors: Alexander Wiegand, Erlenbach (DE); Paul Hanesch, Aschaffenburg (DE); Franz-Josef Lohmeier, Miltenberg (DE); Juergen Pleyer, Stockstadt (DE); Alexander Will, Laudenbach (DE); Andreas Broenner, Johannesberg (DE); Joachim Ciba, Buergstadt (DE); Andre Rother, Woerth a.M. (DE); Jens Kressbach, Klingenberg/Main (DE); Ulrich Staab, Klingenberg/Main (DE); Mirko Di Marco, Klingenberg/Main (DE)

(73) Assignee: Wika Alexander Wiegand SE & Co. KG, Klingenberg/Main (DE)

(*) Notice: Subject to any disclaimer, the term of this patent is extended or adjusted under 35 U.S.C. 154(b) by 399 days.

(21) Appl. No.: 17/502,960

(22) Filed: Oct. 15, 2021

(65) Prior Publication Data
US 2022/0034732 A1  Feb. 3, 2022

Related U.S. Application Data

(63) Continuation of application No. PCT/EP2020/060448, filed on Apr. 14, 2020.

(30) Foreign Application Priority Data

Apr. 17, 2019 (DE) .................... 10 2019 110 190.5

(51) Int. Cl.
*G01L 1/22* (2006.01)
*G01F 1/34* (2006.01)
(Continued)

(52) U.S. Cl.
CPC .............. *G01L 1/22* (2013.01); *G01F 1/34* (2013.01); *G01K 7/18* (2013.01); *G01K 7/34* (2013.01);
(Continued)

(58) Field of Classification Search
CPC ....... G01L 1/22; G01L 9/0051; G01L 9/0072; G01L 19/0061; G01L 19/147;
(Continued)

(56) References Cited

U.S. PATENT DOCUMENTS 9,921,121 B2* 3/2018 Glaab .................. G01L 9/0051
2011/0031566 A1 2/2011 Kim et al.
(Continued)

FOREIGN PATENT DOCUMENTS

DE 10 2006 031 322 A1 9/2007
EP 2711698 A1 * 3/2014 ............. G01K 17/06
WO WO-2019176078 A1 * 9/2019 ......... H01L 51/0021

OTHER PUBLICATIONS

WO-2019176078-A1 English Translation (Year: 2019).*
EP-2711698-A1 English Translation (Year: 2014).*

*Primary Examiner* — Ryan D Walsh
(74) *Attorney, Agent, or Firm* — Muncy, Geissler, Olds & Lowe, P.C.

(57) ABSTRACT

A sensor for detecting pressure and/or filling level and/or flow rate and/or density and/or mass and/or temperature, wherein a sensor component is coupled to a further sensor component by nanowires, and wherein the sensor components are fixed, sealed or electrically contacted to one
(Continued)

another. For example, a sensor component is connected directly to a printed circuit board through nanowires.

20 Claims, 4 Drawing Sheets

(51) Int. Cl.
    *G01K 7/18*     (2006.01)
    *G01K 7/34*     (2006.01)
    *G01L 9/00*     (2006.01)
    *G01L 19/00*     (2006.01)
    *G01L 19/14*     (2006.01)

(52) U.S. Cl.
    CPC .......... *G01L 9/0051* (2013.01); *G01L 9/0072* (2013.01); *G01L 19/0061* (2013.01); *G01L 19/147* (2013.01); *G01L 19/148* (2013.01)

(58) Field of Classification Search
    CPC ........... G01L 19/148; G01F 1/34; G01K 7/18; G01K 7/34
    See application file for complete search history.

(56) References Cited

U.S. PATENT DOCUMENTS

2012/0247216 A1* 10/2012 Ishihara .............. G01L 19/0618
                                                         73/708
2022/0042867 A1* 2/2022 Wiegand ............... G01L 9/0075

* cited by examiner

SENSOR FOR DETECTING PRESSURE AND/OR FILLING LEVEL AND/OR FLOW RATE AND/OR DENSITY AND/OR MASS AND/OR TEMPERATURE

This nonprovisional application is a continuation of International Application No. PCT/EP2020/060448, which was filed on Apr. 14, 2020, and which claims priority to German Patent Application No. 10 2019 110 190.5, which was filed in Germany on Apr. 17, 2019, and which are both herein incorporated by reference.

BACKGROUND OF THE INVENTION

Field of the Invention

The present invention relates to a sensor for detecting pressure and/or filling level and/or flow rate and/or density and/or mass and/or temperature.

Description of the Background Art

Sensors for detecting pressure, filling level, flow rate, density, mass or temperature, are generally known in the art.

SUMMARY OF THE INVENTION

It is therefore an object of the present invention to provide a sensor for detecting pressure and/or filling level and/or flow rate and/or density and/or mass and/or temperature which is improved over the art.

A sensor according to an exemplary embodiment of the invention for detecting pressure and/or filling level and/or flow rate and/or density and/or mass and/or temperature comprises a first sensor component and a further sensor component, wherein the two sensor components are crimped to one another. Herein, at least one side of at least one sensor component is provided with nanowires at least in the area of the crimping, wherein the sensor components are fixed to one another by the nanowires through a force fitting connection and/or through a form fitting connection, and at least one sealing and/or thermally conductive and/or electrically conductive connection is formed between the sensor components in the area of the crimping by the nanowires.

Thus, the sensor has a configuration in which a sensor element or a sensor component is connected to a further sensor component by the nanowires. Herein, the nanowires permanently fix the two sensor components to one another. In addition, this connection is electrically conductive and moreover pressure-tight so that in particular a pressure-tight connection to a process connector or sensor carrier part may be established. Herein, a pressure-tight connection shall in particular be understood to be a connection having a leakage rate of less than $1*10^{-3}$ mbar*l/s. Moreover, a thermal coupling between the sensor components may be realized by the connection in order to transmit heat dissipate heat to the environment outside. Such a connection by nanowires may be realized in a particularly simple and reliable way.

The nanowires can be applied on one side or on both sides directly on the at least one sensor component or are applied strip-like as an intermediate joining layer. Nanowires applied in this way allow for a particularly stable connection. In the case of a one-sided application, a sinter process is carried out at the surface of the respectively other component during compression, wherein the surface may for example be cleaned and/or napped.

A sensor component can be a membrane facing a process and having a thickness of in particular 0.03 mm and 0.05 mm. The further sensor component is a sensor carrier part, wherein the membrane is fixed at the sensor carrier part in a sealing way by a circumferential coupling section and closes a channel to the sensor component. The circumferential coupling section comprises a circular shape having a strip width of 2 mm to 8 mm and is provided with nanowires. In this embodiment, the sensor components form a sensor disk which is reinforced by the completely circumferential coupling section. Thus, the sensor disk is particularly stable mechanically and at the same time configured for an accurate and sensitive detection.

A sensor component can be a printed circuit board or a printed circuit board connector or an electronic component, wherein the sensor component is fixed to a partner component by nanowires, and the partner component thermally or electrically connects the sensor component to another partner component. Such a design is very compact so the sensor design may be particularly low size. Herein, the fixing and contacting by means of the nanowires is very reliable, robust and easy to set up.

The partner component can be a heat sink or a housing section establishing heat dissipation by an enlarged surface compared to the sensor component toward a sensor interior or toward a sensor environment. In the alternative or in addition, a component surface and/or a component edge surface of the sensor component are/is provided with nanowires for heat dissipation toward the sensor interior or toward the sensor environment, wherein the component surface and/or the component edge surface is less than 40 $mm^2$, in particular less than 20 $mm^2$. Such a design is very compact so the sensor design may be particularly low size. At the same time, reliable heat dissipation is ensured. Herein, the fixing and contacting by means of the nanowires is very reliable, robust and easy to set up.

A sensor component can be configured as a contact pin, as a printed circuit board, as a sensor chip, as a sensor, or as a flex connector configured as a rigid flex printed circuit board, i.e. as a segment of a printed circuit board having a film-like, conductive, multipolar electric connection. A connection by nanowires of sensor components configured this way is particularly easy to setup and is characterized by particularly high reliability and robustness.

A further sensor according to the invention for detecting pressure and/or filling level and/or flow rate and/or density and/or mass and/or temperature comprises a first sensor component for detecting pressure and/or filling level and/or flow rate and/or density and/or mass and/or temperature and at least one further sensor component, wherein the first sensor component comprises a strain-sensitive section, contacting surfaces on a coupling section and strain gauge resistors and/or surfaces for capacitive detection of a camber of the strain-sensitive section. The further sensor component comprises contacting surfaces connected to conductor paths and components configured to analyze the camber of the strain-sensitive section. Individual contacting surfaces or parts of the contacting surfaces of the first sensor component are congruent with partial surfaces of the contacting surfaces of the further sensor component. Herein, at least one contacting surface is at least in sections provided with nanowires, wherein the nanowires establish a fixing effect and/or an electric connection of the sensor components to one another.

Thus, the sensor has a configuration in which a sensor element or a sensor component can be connected to a further sensor component by the nanowires. Herein, the nanowires permanently fix the two sensor components to one another. In addition, this connection is electrically conductive and moreover pressure-tight so that in particular a pressure-tight connection to a process connector or sensor carrier part may be established. Herein, a pressure-tight connection shall in particular be understood to be a connection having a leakage rate of less than $1*10^{-3}$ mbar*l/s. Such a connection by nanowires may be realized in a particularly simple and reliable way.

The nanowires can be applied on one side or on both sides directly on at least one of the sensor components or are applied strip-like as an intermediate joining layer. Nanowires applied in this way allow for a particularly stable connection. In the case of a one-sided application, a sinter process is carried out at the surface of the respectively other component during compression, wherein the surface may for example be cleaned and/or napped.

The first sensor component can be connected to a sensor carrier part by nanowires. Such a configuration allows for a simple, safe and media-tight arrangement of the first sensor component at the sensor carrier part. Herein, a media-tight arrangement shall in particular be understood to be an arrangement having for example a leakage rate of less than $1*10^{-3}$ mbar*l/s.

The further sensor component can comprise a section extending beyond a circumference of the first sensor component and being electrically and mechanically connected to a sensor carrier part by a nanowire connection formed by nanowires. Herein, the nanowires permanently fix the further sensor component and the sensor carrier part to each other. In addition, this connection is electrically conductive and moreover pressure-tight so that the first sensor component is excluded from a sensor volume formed above the further sensor component in a pressure-tight manner. Herein, a pressure-tight exclusion shall in particular be understood to be an exclusion having for example a leakage rate of less than $1*10^{-3}$ mbar*l/s.

The nanowires can be applied on one side or on both sides and formed from copper, tin, silver, nickel, gold or stainless steel. Such a configuration allows for a simple and reliable connection between the respective mating parts by means of the nanowires, in particular if at least one of the mating parts is made of brass, stainless steel, an alloy, ceramics or silicon oxide ceramics.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
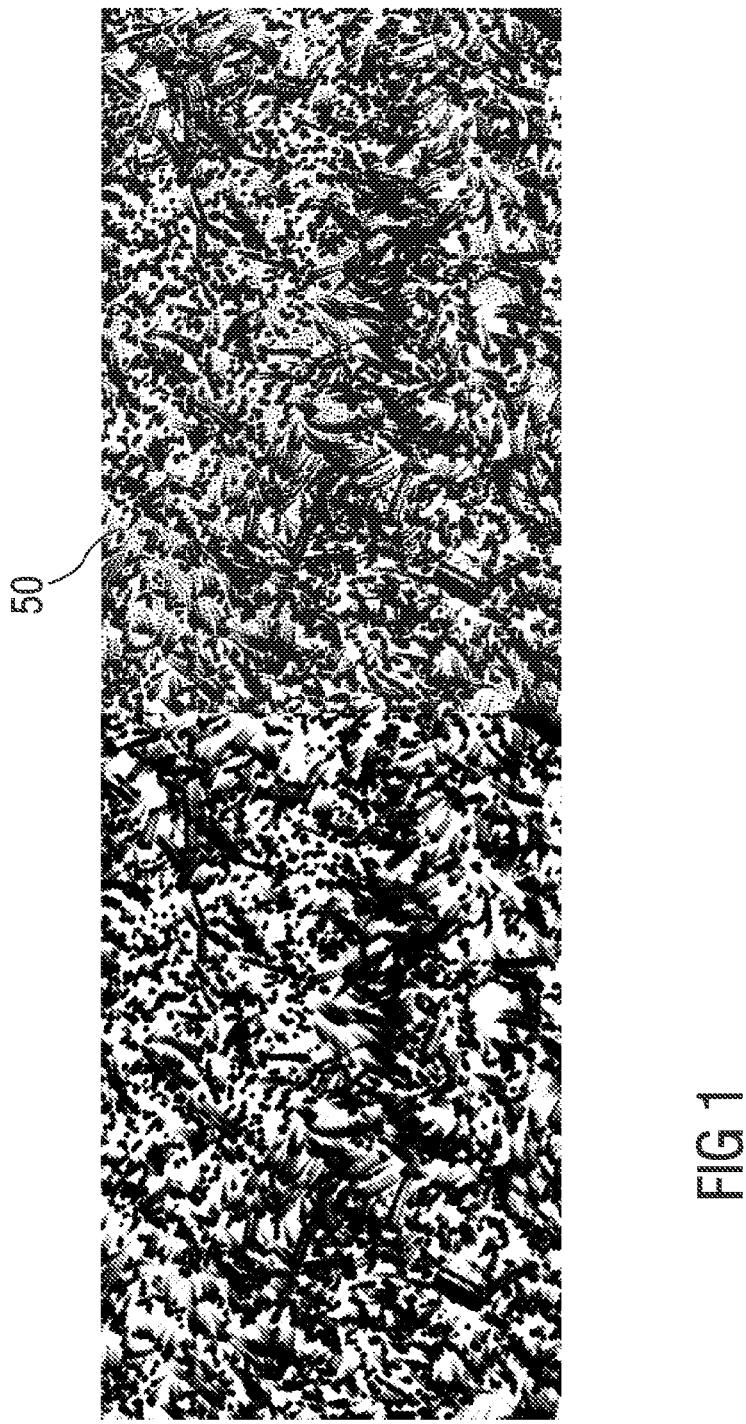
FIG. 1 is a schematic view of nanowires.

FIG. 1 shows nanowires 50.

Such nanowires 50 are metallic wires which are applied on a surface of a component. This component may then be crimped with another component which is also provided with such a nanowire surface or which is likewise being used without nanowires 50 with a normal or napped surface. In the former embodiment, the nanowires 50 dig into each other.

The nanowires 50 are metallic and made by electrochemical processes.

Herein, the term nanowire 28 used in the following may also refer to an aggregation of multiple wires or fibers.

When crimping the components, a force-fit and/or form-fit connection results which is realized through a combination of different forces, e.g. Van-der-Waals forces.

Aside from these forces, an optimization of the further forces aside from the relatively weak non-covalent interactions between atoms or molecules may be established by setting further parameters.

In summary, a force-fit and/or form-fit connection amounting to a multiple of the Van-der-Waals forces may be produced by the nanowires 50, as the nanowires 50 additionally dig and crimp into each other with their surfaces.

Such a technique is generally also described in the publications US 2011/0039459 or US 2016/0143153.

Figure 2:
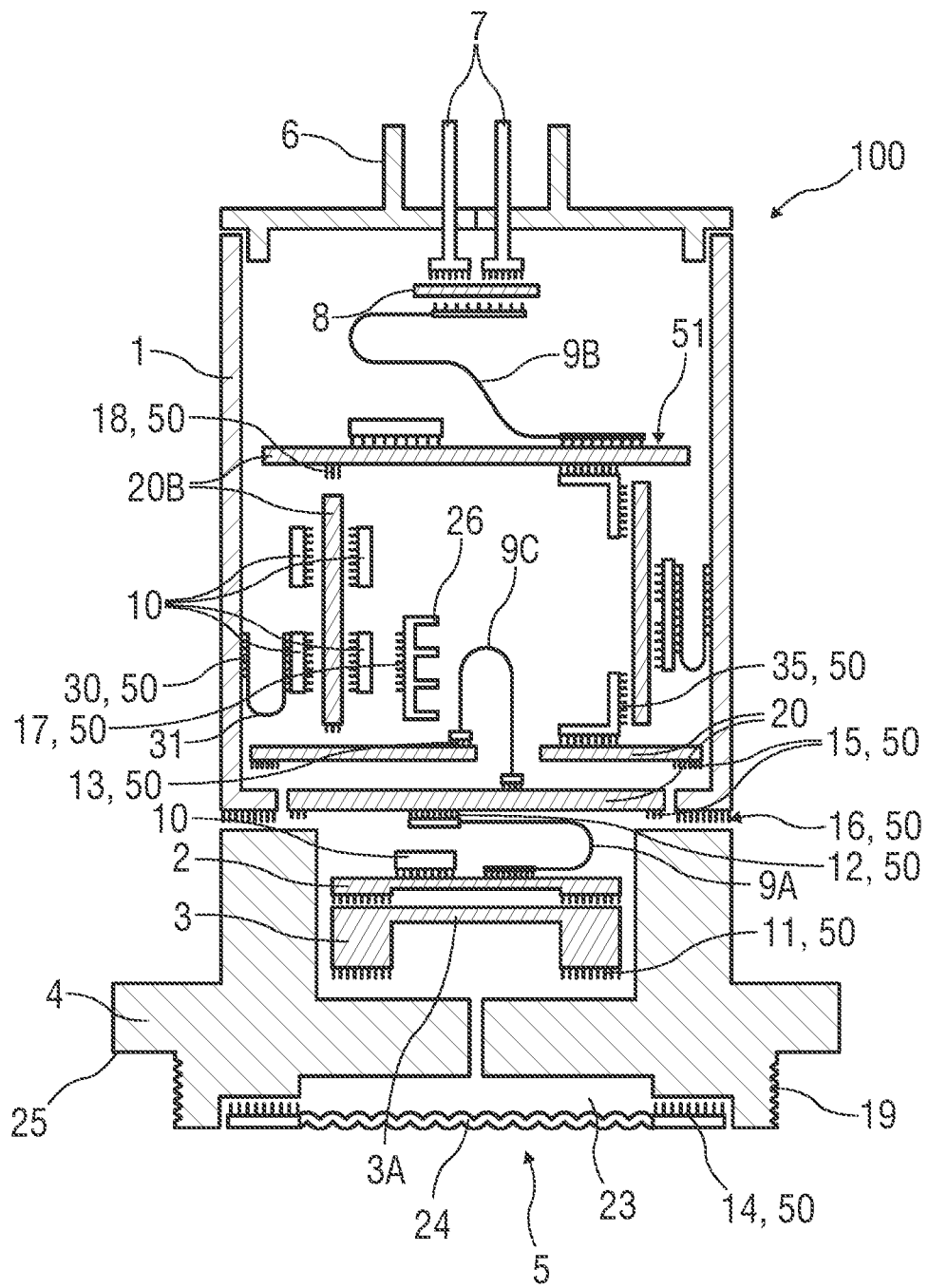
FIG. 2 is a schematic sectional view of a sensor for detecting pressure, filling level, density, temperature and/or flow rate.

FIG. 2 shows a sectional view of a possible embodiment of a sensor 100 for detecting pressure and/or filling level and/or flow rate and/or density and/or mass and/or temperature.

The sensor 100 comprises a housing 1, a first sensor component 3, a further sensor component 2 and a further sensor component 4 configured as a sensor carrier part 4. Herein, the first sensor component 3 is in particular configured for detecting pressure; however it may also detect another physical quantity such as filling level, flow rate, density, mass and/or temperature. Herein, the sensor component 3 is for example made of ceramics or stainless steel.

For this purpose, the sensor component 3 comprises a thin section 3A sensitive to deflection. When being subjected to pressure, this section 3A cambers, wherein a maximum of the camber is in particular in the center thereof. Herein, the section 3A sensitive to deflection in particular deflects toward the side facing away from a process medium.

This side facing away from the process is provided with an electronic analysis device. This analysis device for example comprises at least one strain gauge strip 34 or a capacitive sensor system.

The first sensor component 3 is connected to the sensor carrier part 4 in a sealing manner by means of a nanowire connection 11 comprising a plurality of nanowires 50.

Herein, the nanowires 50 for example have a thickness from 0.3 µm to 4.0 µm with a length from e.g. 10 µm to 800 µm. Herein, a holding force reaches for example 10 MPa to 30 MPa.

The nanowires 50 are applied on one side or on both sides directly on the coupling section of the sensor component 3 or on a coupling section of the upper further sensor component 2. In the alternative, the application may be made strip-like as an intermediate joining layer and/or as a ring belt. Likewise, the application of the nanowires 50 may be carried out on both mating parts.

In the case of a one-sided application, during compression of the sensor component 3 and the further sensor component 2, a sinter process is carried out at the surface of the respectively other component. In order to optimize this sinter process, the surface is for example cleaned and/or napped prior to this.

In a possible embodiment, the further sensor component 2, which is in particular disk-like, is configured as a printed circuit board or comprises a printed circuit board, wherein it carries electronic components 10 of an analysis circuit 51 and/or conductor paths. Herein, the components 10 may likewise be mounted by nanowire connections.

In a possible embodiment, the first sensor component 3 is coupled through a flexible printed circuit board connector 9A to a further sensor component 20 configured as a printed circuit board, wherein nanowires 50 are applied on the printed circuit board and/or on the printed circuit board connector 9A and form a nanowire connection 12. The further sensor component 20 configured as a printed circuit board may comprise plugs or a flexible printed circuit board (abbreviated: FPC).

In a further possible embodiment, a further printed circuit board connector 9C is provided with micro plug connection elements 13 which operate similar to a micro plug through multipolar nanowire fields, wherein individual contacts are substituted by small fields or field areas with a nanowire cover.

The sensor carrier part 4 faces a process with a closed opening of a process access 5 and may be sealed against this process by a contour 25 and/or by a thread 19. In a possible embodiment, the process access 5 is provided with a protective membrane 24 which is in particular configured as a so called diaphragm seal. Optionally, a space 23 behind this protective membrane is filled with a fluid, e.g. oil.

The protective membrane 24, which for example has a round configuration, is provided with nanowires 50 circumferentially at an edge and is crimped with the sensor carrier part 4 in a sealing manner forming a nanowire connection 14.

The protective membrane 24 is for example made of stainless steel or of a special material, e.g. zirconium, a nickel copper alloy of approximately 65% nickel, 33% copper and 2% iron, also known as Monel, a nickel-base alloy, e.g. a nickel molybdenum alloy, a nickel chromium molybdenum alloy, a nickel molybdenum chromium alloy or a nickel chromium iron alloy, or a different material.

The sensor carrier part 4 may be made of brass or stainless steel or any other suitable metallic material or of any other suitable metallic alloy to be connected via nanowires 50 to the first sensor component 3 which may for example be formed from ceramics or silicon oxide ceramics. Herein, the nanowires 50 may be made of copper, tin, silver, nickel, gold or stainless steel.

With regard to internal connections, in particular the further sensor components 20 configured as printed circuit boards are likewise be connected to the housing 1 through nanowires 50 forming nanowire connections 15. This way, a fixing and grounding of the printed circuit boards is achieved if respective surfaces of the printed circuit boards are configured for this purpose regarding the course of the conductor paths. This way, in particular electromagnetic compatibility (EMC) targets may be met better and complex connectors may be saved.

Moreover, in a possible embodiment, the housing 1, which is in particular made of metal, is likewise connected to the sensor carrier part 4 through nanowires 50 forming nanowire connections 16. For this purpose, a flanged edge made of sheet metal or the sensor carrier part 4 is for example circumferentially provided with nanowires 50.

Moreover, in a possible embodiment, at least one electronic component 10 carries a heat sink 26 which is coupled through nanowires 50 forming a nanowire connection 17 thus allowing for a thermal heat dissipation, e.g. to a calculator chip or an ASIC (Application-Specific Integrated Circuit). In the alternative or in addition, this may also be achieved through a woven flex connector 31 made of metal which may also be configured as a film and which forms a nanowire connection 30 to the housing 1 by nanowires 50.

Moreover, further sensor components 20B configured as printed circuit boards may be mechanically and electrically connected directly through nanowire connections 18 formed by nanowires 50 thereby firmly orienting them in the sensor 100.

Likewise, for this purpose, angle joints with nanowire connections 35 formed from nanowires 50 may be made for example from continuous material and also multipolar, if these are combined or alternatingly pervaded with insulating material, wherein the angle joints are then provided with nanowires 50 in sections.

A plug 6 is lead out of the housing 1 of the sensor 100. Herein, contacts 7 of the plug 6 may internally be connected with a plug or a base plate 8 which is connected to the analysis circuit 51 through a cable 9B. The cable 9B may be one-core or multi-core.

Figure 3:
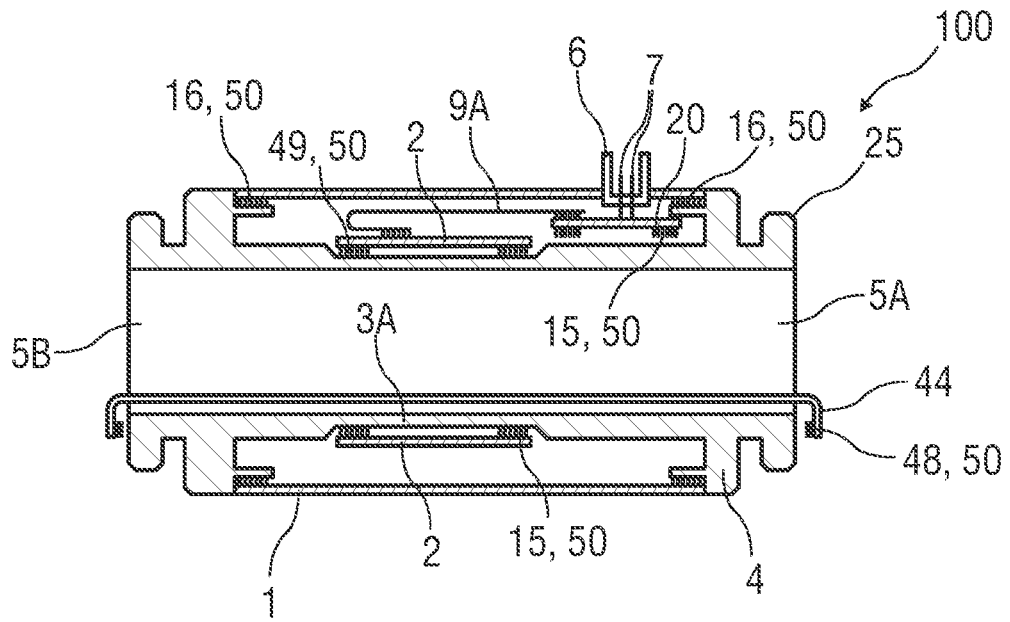
FIG. 3 is a schematic sectional view of a sensor configured as a pipe sensor for detecting pressure and/or filling level and/or flow rate and/or density and/or mass and/or temperature.

FIG. 3 shows a sectional view of a possible embodiment of a sensor 100 configured as a pipe sensor for detecting pressure and/or filling level and/or flow rate and/or density and/or mass and/or temperature.

For this purpose, the sensor 100 comprises two process openings 5A, 5B on opposite sides, the process openings 5A, 5B being connected with a sensor carrier part 4 configured as a pipe section.

A flange-shaped geometry 25 is configured for a pressure-tight connection to a process, e.g. by two semicircular clamps. Herein, a pressure-tight connection shall in particular be understood to be a connection having for example a leakage rate of less than $1*10^{-3}$ mbar*l/s.

The sensor 100 comprises a thin first section 3A sensitive to deflection which is detected regarding deflection under pressure in a capacitive way by a further sensor component 2 configured as a circumferential skin surface 2. Herein, the further sensor component 2 or a protective foil section 44 lying within the sensor 100 are fastened through nanowire connections 48, 49 formed by nanowires 50.

A printed circuit board connector 9A configured as a flexible foil conductor establishes the connection to an electronic component 10 configured as an analysis board which is also connected with the sensor carrier part 4 through a nanowire connection 15 formed by nanowires 50.

The sensor carrier part 4 is in sections enclosed by a tubular housing 1, wherein the housing 1 and the sensor carrier part 4 are connected to one another through a nanowire connection 16 formed by nanowires 50 in a sealing and rigid way. Spaces enclosed between the housing 1 and the sensor carrier part 4 may be evacuated.

Figure 4A:
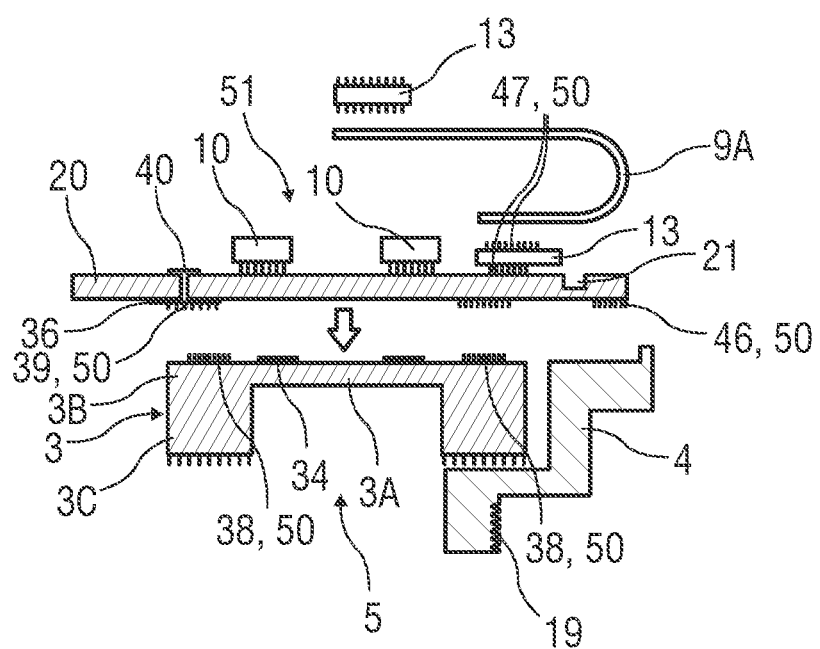
FIG. 4A is a schematic sectional view of components of a sensor for detecting pressure and/or filling level and/or flow rate and/or density and/or mass and/or temperature.
Figure 4B:
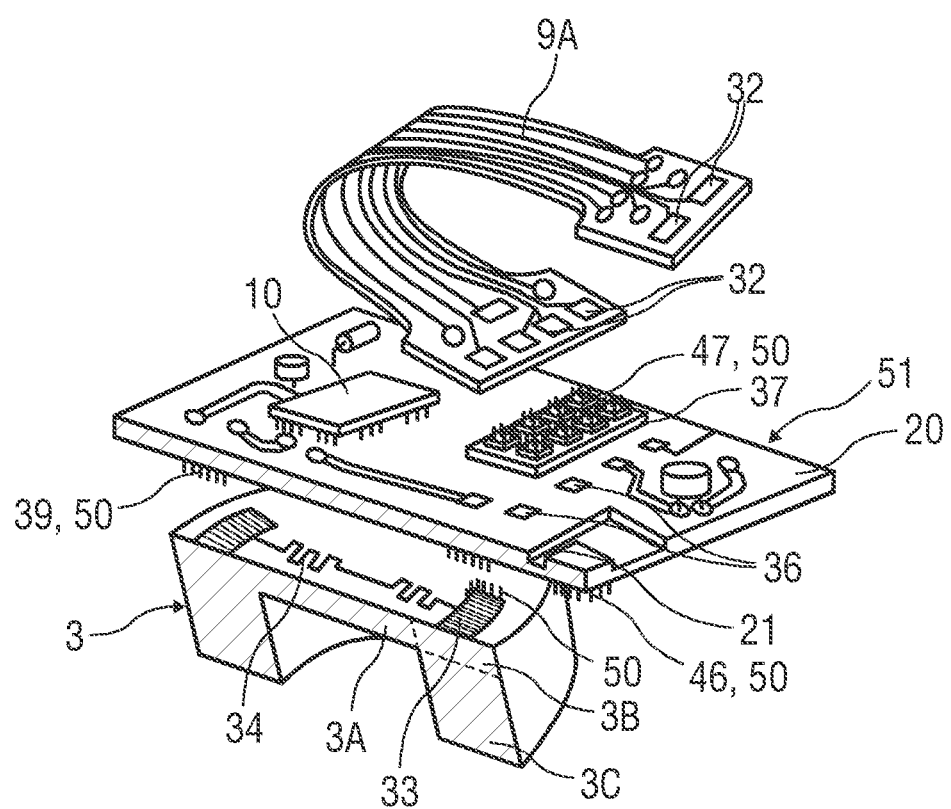
FIG. 4B is a schematic perspective view of the sectional view of the components according to FIG. 4A.

FIGS. 4A and 4B show a sectional view of components of a possible embodiment of a sensor 100 for detecting pressure and/or filling level and/or flow rate and/or density and/or mass and/or temperature from different points of view.

The sensor 100 comprises a sensor component 3 configured as a hat sensor, i.e. in particular pot-shaped, which is made for example from ceramics or stainless steel and which is provided with strain gauge strips 34 for detecting a deflection and/or cambering generated under a process pressure applied from below through a process access 5.

The sensor component 3 comprises in particular a first, thin section 3A sensitive to deflection which is being resistively monitored through the resistors configured as strain gauge strips 34.

Moreover, the sensor component 3 comprises a reinforcement section 3C extending in the edge area in a circular fashion below the section 3A sensitive to deflection.

Moreover, a coupling section 3B formed to the section 3A sensitive to deflection extends circumferentially around the section 3A sensitive to deflection, the coupling section 3B comprising contacting surfaces 33 connected to the strain gauge strips 34.

The contacting surfaces 33 are for example arranged around the section 3A sensitive to deflection in a segment-like fashion and are configured for a contacting with a further sensor component 20 configured as a printed circuit board. For this purpose, the further sensor component 20 comprises corresponding contacting surfaces 36.

Optionally, nanowires 50 for forming nanowire connections 38, 39 are located on the contacting surfaces 33, 36 on one or both of the sensor component 3 and the further sensor component 20 configured as a printed circuit board.

In a possible embodiment, plated-through holes 40 of the further sensor component 20 configured as a printed circuit board are connected with the contacting surfaces 36 in order to electrically connect electronic components 10 on the other side of the further sensor component 20 configured as a printed circuit board. This way, a complex contacting of a sensor, which is typically done by possibly flawed bonding processes, may be adapted. Moreover, aluminum or gold bond wires may be saved and the connection of the sensor component 3 and an electronics assembly may be achieved particularly compact within a confined space.

As shown in FIG. 4B, the contacting surface 33 of the sensor component 3 is for example configured as a semicircular segment and provided with nanowires 50 which are crimped with nanowires 50 of the further sensor component 20 configured as a printed circuit board to form a nanowire connection 39. Herein, the further sensor component 20 configured as a printed circuit board is positioned relative to the sensor component 3 and the crimping is performed subsequently.

In addition, the further sensor component 20 configured as a printed circuit board is thinned out in at least one place by a recess so that a flexible printed circuit board section 21 results. At this printed circuit board section 21, nanowires 50 are arranged which, upon connection with the sensor carrier part 4, establish a nanowire connection configured as a grounding connection to the sensor carrier part 4. Herein, the recess allows for compensating in particular small differences in level.

A printed circuit board connector 9A configured as a flexible foil conductor provides the connection to a continuative board or to a plug connection for outputting the measuring signals.

An electrical coupling of this printed circuit board connector 9A configured as a flexible foil conductor is for example realized by a press-fit connector 37 which comprises for example nanowires 50 on both sides for forming nanowire connections 47 on several pads which are on both sides connected to each other by plated-through holes.

By means of the press-fit connector 37, the printed circuit board connector 9A configured as a flexible foil conductor or contacting surfaces 32 thereof may be permanently electrically connected with the further sensor component 20 configured as a printed circuit board, a plug component, the sensor component 3 and its contacting surfaces 33, a housing section or partial surfaces of the sensor carrier part 4, without requiring soldering processes or complex plug connections.

Likewise, depending on the size of the contacting surfaces 23, a signal contacting surface may be adapted by enlargement to become a connection surface for higher currents.

For example, the contacting surfaces 32 may possibly be circular, square or rectangular; the nanowires 50 may be applied on one side or on both sides. A connection established this way in particular turns out to be particularly durable and is also inure to vibrations and small expansions which may occur for example due to temperature fluctuations, i.e. relative movements between the components.

Although not shown, a direct connection of the printed circuit board connector 9A configured as a flexible foil conductor with a sensor surface of the sensor 3, i.e. instead the further sensor component 20 configured as a printed circuit board, is also possible.

The invention is not limited to the above described detailed embodiments. The invention may be modified within the scope of the following claims. Likewise, individual aspects from the dependent claims may be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor for detecting at least one of a pressure, a filling level, a flow rate, a density, a mass or a temperature, the sensor comprising:
   nanowires; and
   sensor components comprising a first sensor component and at least one further sensor component,
   wherein the sensor components are crimped to one another,
   wherein at least one side of at least one of the sensor components is provided with the nanowires at least in an area of the crimping,
   wherein the sensor components are fixed to one another by the nanowires through at least one of a force fitting connection and a form fitting connection,
   wherein at least one connection is formed between the sensor components in the area of the crimping by the nanowires, the at least one connection being at least one of a sealing connection or a thermally conductive connection, and
   wherein an electrically conductive connection is also formed between the sensor components in an area of the crimping by the nanowires, and
   the sensor further comprising a partner component that is provided in addition to the first sensor component and the at least one further sensor component, wherein one of the at least one further sensor component is a printed circuit board, a printed circuit board connector or an electronic component, wherein the one of the at least one further sensor component is fixed to the partner component by the nanowires.

2. The sensor according to claim 1, wherein the nanowires are applied directly on the at least one side or on both sides of the at least one of the sensor components.

3. The sensor according to claim 1, wherein the nanowires are applied strip-like as an intermediate joining layer on the at least one of the sensor components.

4. The sensor according to claim 1, wherein the first sensor component is a membrane facing a process medium, wherein one of the at least one further sensor component is a sensor carrier part, wherein the membrane is fixed at the sensor carrier part in a sealing way by a circumferential coupling section to enclose a channel to the membrane, and wherein the circumferential coupling section comprises a circular shape having a strip width of 2 mm to 8 mm and is provided with the nanowires.

5. The sensor according to claim 4, wherein the membrane has a thickness of 0.03 mm and 0.05 mm.

6. The sensor according to claim 1, wherein the partner component thermally or electrically connects the one of the at least one further sensor component to another partner component.

7. The sensor according to claim 6, wherein the partner component is a heat sink or a housing section of a housing of the sensor establishing a heat dissipation by an enlarged surface compared to the one of the at least one further sensor component toward one of a sensor interior and a sensor environment.

8. The sensor according to claim 7, wherein the one of the at least one further sensor component comprises at least one of a component surface or a component edge surface, wherein the at least one of the component surface or the component edge surface is provided with the nanowires for heat dissipation toward one of the sensor interior or toward the sensor environment, and wherein the at least one of the component surface or the component edge surface is less than 40 mm$^2$.

9. The sensor according to claim 8, wherein the at least one of the component surface or the component edge surface is less than 20 mm$^2$.

10. The sensor according to claim 1, wherein one of the sensor components is configured as: a contact pin, a printed circuit board, a sensor chip, a sensor, or a flex connector configured as a rigid flex printed circuit board.

11. The sensor according to claim 10, wherein the rigid flex printed circuit board is a segment of a printed circuit board having a film-like, conductive, multipolar electric connection.

12. The sensor according to claim 1, wherein the nanowires are formed from one of copper, tin, silver, nickel, gold or stainless steel.

13. The sensor according to claim 1, wherein the partner component is indirectly connected to the first sensor component via the at least one further sensor component.

14. A sensor for detecting at least one of a pressure, a filling level, a flow rate, a density, a mass or a temperature, the sensor comprising:

sensor components comprising a first sensor component for detecting at least one of the pressure, the filling level, the flow rate, the density, the mass or the temperature and comprising at least one further sensor component, wherein the first sensor component comprises a strain-sensitive section, a coupling section having contacting surfaces with at least one of strain gauge resistors or strain gauge surfaces thereon for capacitive detection of a camber of the strain-sensitive section, wherein the at least one further sensor component comprises contacting surfaces connected to conductor paths and components configured to analyze the camber of the strain-sensitive section, wherein at least parts of the contacting surfaces of the first sensor component are congruent with partial surfaces of the contacting surfaces of the at least one further sensor component, wherein at least one of the contacting surfaces of the first sensor component or the contacting surfaces of the at least one further sensor component is, at least in sections, provided with nanowires, and wherein the nanowires establish at least one of a fixing effect and an electric connection of the first sensor component and the at least one further sensor component to one another, the sensor further comprising a partner component that is provided in addition to the first sensor component and the at least one further sensor component, wherein one of the at least one further sensor component is a printed circuit board, a printed circuit board connector or an electronic component, wherein the one of the at least one further sensor component is fixed to the partner component by the nanowires.

15. The sensor according to claim 14, wherein the nanowires are applied directly on at least one side or both sides of the first sensor component or the at least one further sensor component.

16. The sensor according to claim 14, wherein the nanowires are applied strip-like as an intermediate joining layer on the first sensor component or the at least one further sensor component.

17. The sensor according to claim 14, further comprising a sensor carrier part, wherein the first sensor component is connected to the sensor carrier part by nanowires.

18. The sensor according to claim 14, further comprising a sensor carrier part, wherein the at least one further sensor component comprises a section extending beyond a circumference of the first sensor component and being electrically and mechanically connected to the sensor carrier part by a nanowire connection formed by nanowires.

19. The sensor according to claim 14, wherein the nanowires are formed from one of copper, tin, silver, nickel, gold or stainless steel.

20. The sensor according to claim 14, wherein the partner component is indirectly connected to the first sensor component via the at least one further sensor component.

\* \* \* \* \*